Dec. 23, 1941.  C. L. EKSERGIAN ET AL  2,267,588
WHEEL COVER ATTACHING MEANS
Filed Aug. 24, 1937  2 Sheets-Sheet 1
FIG. 1.
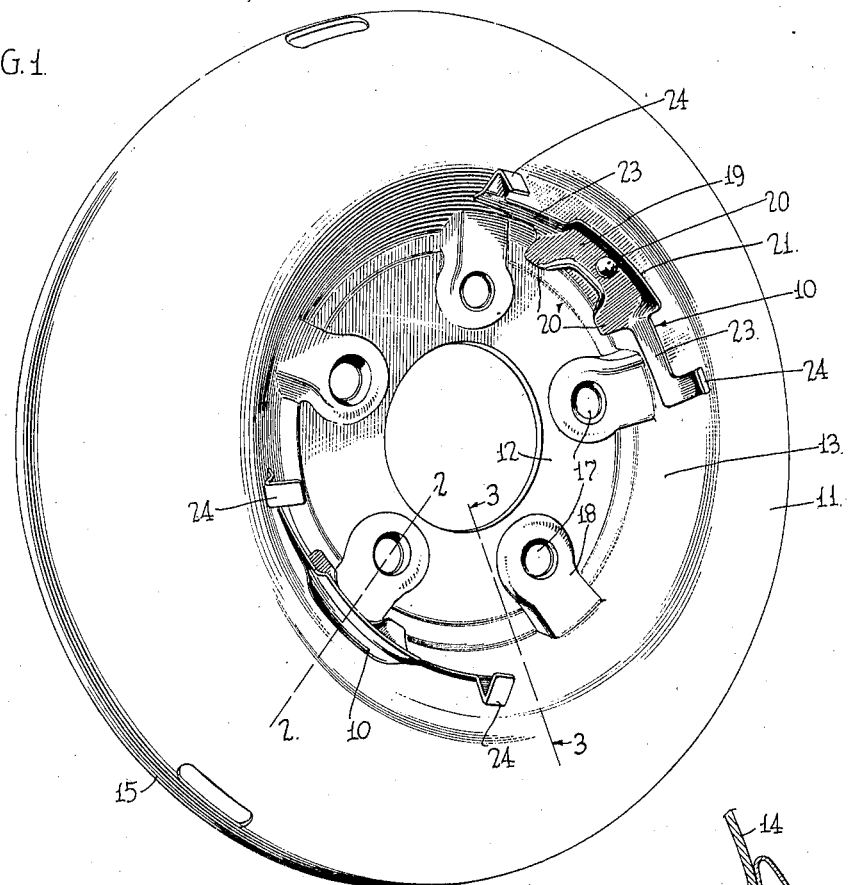
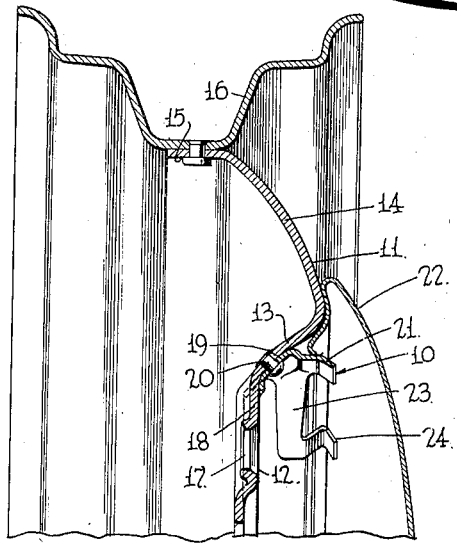
FIG. 2.
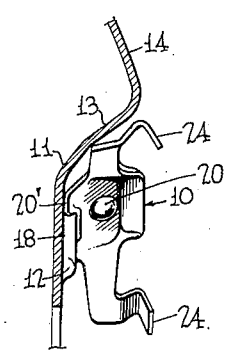
FIG. 3.
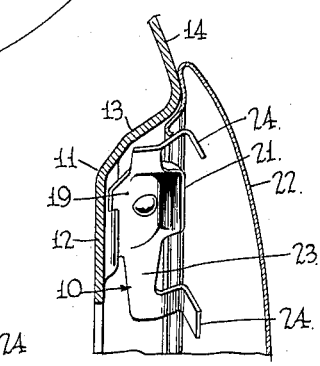
FIG. 4.
INVENTORS
CAROLUS L. EKSERGIAN
PAUL W. GAENNSSLE
BY John P. Barbour
ATTORNEY.

Dec. 23, 1941.　　C. L. EKSERGIAN ET AL　　2,267,588
WHEEL COVER ATTACHING MEANS
Filed Aug. 24, 1937　　2 Sheets-Sheet 2
FIG.5
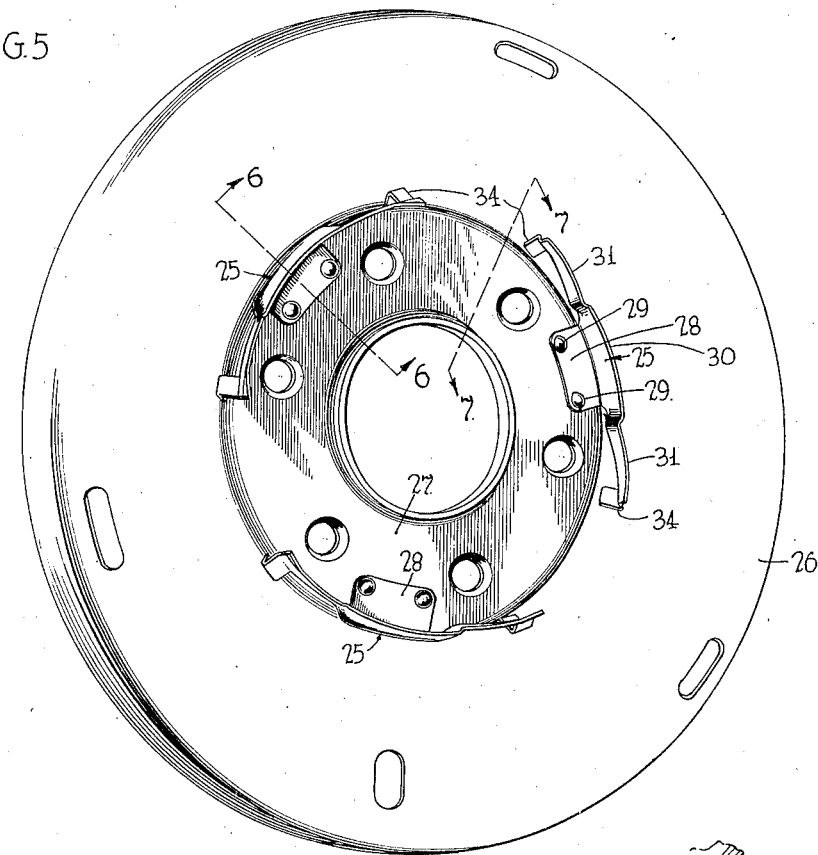
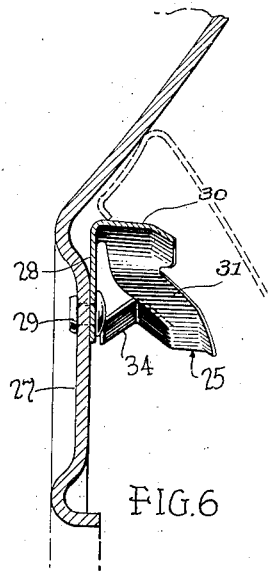
FIG.6
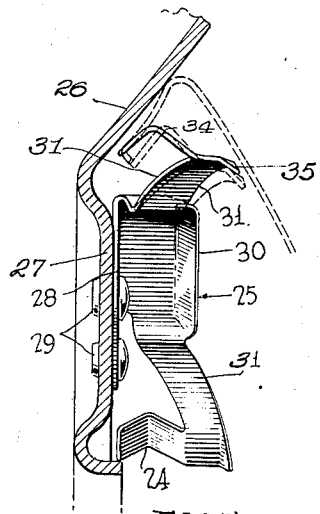
FIG.7
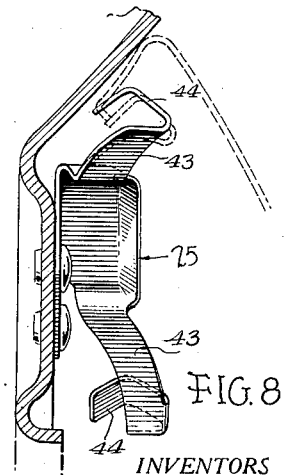
FIG.8
INVENTORS
Carolus L. Eksergian.
Paul W. Gaenssle.
BY
John P. Tarbox
ATTORNEY.

Patented Dec. 23, 1941

2,267,588

UNITED STATES PATENT OFFICE 2,267,588

WHEEL COVER ATTACHING MEANS

Carolus L. Eksergian and Paul W. Gaenssle, Detroit, Mich., assignors to Budd Wheel Company, Philadelphia, Pa., a corporation of Pennsylvania Application August 24, 1937, Serial No. 160,584

7 Claims. (Cl. 301—108)

The invention relates to vehicle wheels and has to do with novel means for detachably securing a wheel and a hub cap or other cover member.

It is an object of the invention to provide such attaching means as can be readily shaped from spring steel and which serves to secure and lock the parts together without interfering with their ready separation as desired.

Another object of the invention is to provide spring attachment clips having means for centering the parts to be attached and for guiding them to the mounting position.

According to one form of the invention, such means may comprise a series of integrally formed members of spring steel. Each of such members may comprise a mounting portion for securing it to a wheel, an axially extending seating and guiding portion for the periphery of the cap or cover and a narrow elongated flexible arm or arms freely extending from the mounting portion and having a locking extension from its free end of generally right or obtuse angle form, the apex of the angle projecting radially and extending generally in the plane normal to the axis of a wheel with which the attachment clip is associated. Where two flexible arms are provided, they extend generally in opposite directions from the central mounting portion and in a generally circumferential direction so that their oppositely extending free ends lie fairly close to the wheel body. According to one form of the invention, the angular extensions on these spring arms are extended laterally therefrom but they may be reversely bent over the outer free ends of the arms, the action of the spring being substantially the same in both instances, namely to give a double spring action effect thereby facilitating the attachment and detachment of the parts.

In the drawings:

Fig. 1 is a perspective view of a convexly dished disc wheel body showing the invention applied thereto;

Fig. 2 is a detailed sectional view through half of the wheel body shown in Fig. 1, the section being taken approximately on the line 2—2 of Fig. 1 looking in the direction of the arrows at the end of the line. This view shows the rim and a portion of the hub cap seated in place;

Figs. 3 and 4 are fragmentary detail sectional views taken substantially on the line 3—3 of Fig. 1 looking in the direction of the arrows at the end of the line. One of these views shows the wheel body with the hub cap removed and the other with the hub cap in position;

Fig. 5 shows in perspective a disc wheel body of the concavely dished type with a slightly modified form of the invention applied thereto;

Fig. 6 is an enlarged fragmentary detailed sectional view through the central portion of the disc of Fig. 5, the section being taken approximately on the line 6—6 of Fig. 5 and looking in the direction of the arrows at the end of the line;

Fig. 7 is a corresponding view taken substantially on the line 7—7 of Fig. 5 and looking in the direction of the arrows at the end of the line; and Fig. 8 is a view corresponding to Fig. 7 showing a slightly modified form of attachment clip.

According to the invention shown in Figs. 1 to 4 inclusive, but two attachment clips 10 are employed. These clips are arranged at opposite sides of the central opening of the wheel body 11. The wheel body 11 in this instance comprises a disc having a radial bolting on flange 12 merging outwardly into a conical portion 13 which in turn merges with a reversely conical portion 14 terminating peripherally in a flange 15 for mounting and securing the rim 16. In this instance, the bolting on flange is formed with five openings 17 for mounting the wheel body to the hub and in line with these openings, it is formed with shallow ribs 18.

To accommodate one of the ribs 18 and form a three point support for the mounting portion 19 of the integral spring clip 10, this mounting portion which is seated on the conical portion 13 of the wheel body and secured by a single rivet 20, is provided with lateral inward extensions 20' resting against the radially extending bolting on flange 12.

The mounting portion 19 is extended axially outwardly by a portion 21 having its outer margin inturned as shown in Fig. 2 to guide and seat the margin of the hub cap 22. From this central mounting and guiding portion of the clip, extend in general circumferential direction and in opposite directions the elongated freely projecting spring arms 23 which are substantially longer than their width, at least preferably twice as great in length as in width. These flexible spring arms are provided at their free extremities with locking extensions 24, these extensions extending laterally from the ends of the arms and being of angular cross section with their apices arranged in a plane normal to the wheel axis. The angularity of the locking extensions is preferably, at least, a right angle or an angle greater than a right angle, such as to insure ease of attachment and adequate locking. These extensions of the arms of the spring clip engage the margin of the hub cap to hold it in place.

Where two spring clips are employed, it will be obvious that by this construction there are four angular locking extensions 24 securing the hub cap or cover member. A very effective spring action is obtained by the arms 23 and their extensions 24 by reason of the fact that the arms do not merely flex in a plane normal to the axis of the wheel but also due to the action of the locking extensions which are engaged by the cap, they are given a twisting flexure, the spring clips thus have in effect a double spring action.

It will be obvious that when the wheel and hub cap are moved relatively axially for mounting the cap, the margin of the cap will be guided by the inclined outer arms of the angular locking extensions 24 and the inclined outer margin of the seating extension 21. During this movement the arms 23 will be flexed inwardly until the margin of the hub cap rides over the apices of the angles when the hub cap will be snapped into place under the action of the spring arms 23 and the inner inclined wall of the angular locking extensions 24. In this position, the axially extending seating portions 21 support and center the hub cap. In Fig. 4 it will be noted that the arms are held in the flexed position when the hub cap is in place. When the hub cap is withdrawn, they spring back to the position shown in Fig. 3.

The modification shown in Figs. 5, 6 and 7 is essentially similar to the construction already described. In this case, three unitary clips designated 25 are employed, the wheel which is attached being shown as an outwardly dished disc 26 having a radial bolting on flange 27, the bolting on flange in this case being provided with six bolt holes. Each of the spring clips 25 is attached to the bolting on flange by a radially extending mounting portion 28 which is secured to the bolting on flange by a pair of rivets 29. Since there are three clips and six bolt holes, one of the clips is secured between alternate pairs of bolt holes. The guiding and centering portion 30 of the clips shown in this modification is substantially similar to the portion 21 of the preceding form, and the spring arms 31 correspond to the spring arms 23 in the preceding form. In this case, however, the arms are extended axially outwardly at more of an angle as shown in Fig. 5 and the angular locking extensions 34 from their ends project inwardly toward the wheel instead of outwardly away from the wheel as in the preceding form. The extreme outer ends of the arms 31 are turned inwardly at 35 to afford clearance for the peripheral margin of the hub cap. Except for these slight changes, the action of the attaching clips in this modification is substantially the same as in the preceding modification.

In either of the modifications as shown in Figs. 1 to 4 or in Figs. 5 to 7, the angular locking portions as 24 or 34 might be reversely bent over the ends of the arms as shown in the modification of Fig. 8 where the arms corresponding to 23 and 33 in the other figures are designated 43 and the angular locking portions corresponding to the angular locking portions 24 and 34 are designated 44. The action of this modification is also substantially the same as the preceding modifications, the locking extensions 44 having an additional spring action from that of the arms 43 to obtain in effect a double spring action.

While the invention has been shown as applied to two specific types of wheel bodies, and two different types of hub caps, it will be understood that it is equally applicable to other types of wheels and such modifications are to be considered to be comprehended in the broad terminology of the claims appended thereto.

What we claim is:

1. In combination, a wheel, a cover member removably associated with the outer face of the wheel and means for locking said cover member in place comprising a plurality of one-piece spring clips arranged substantially on the same diameter at circumferentially spaced locations, each of said clips comprising an attaching portion for securing it to the wheel, an elongated resiliently flexible portion extending freely at an angle to said attaching portion and having at its free end a locking extension thereof bent to form an angular portion the sides of which provide cam surfaces, the apices of all said angular portions lying substantially in a plane normal to the axis of the wheel when the clip is in position thereon, one side of each of said angular portions being arranged to form a cam surface engaged by a marginal portion of said cover member when it is applied to said wheel and cam the elongated flexible portion aside until the marginal portion of the cover passes the apex of the angle when the cover member may be snapped into place and securely held therein by the engagement of its marginal portion with the cam surface formed by the other side of said angular portion of the locking extension, each clip comprising also an axially extending seating portion independent of the flexible portion for forming a radial seat for the marginal portion of the cover member.

2. In combination, a wheel, a cover member removably associated with the outer face of the wheel and means for locking said cover member in place comprising a plurality of one-piece spring clips arranged substantially on the same diameter at circumferentially spaced locations, each of said clips comprising an attaching portion for securing it to the wheel, an elongated resiliently flexible portion extending freely at an angle to said attaching portion and having at its free end a locking extension thereof bent to form an angular portion the sides of which provide cam surfaces, the apices of all said angular portions lying substantially in a plane normal to the axis of the wheel when the clip is in position thereon, one side of each of said angular portions being arranged to form a cam surface engaged by a marginal portion of said cover member when it is applied to said wheel and cam the elongated flexible portion aside until the marginal portion of the cover passes the apex of the angle when the cover member may be snapped into place and securely held therein by the engagement of its marginal portion with the cam surface formed by the other side of said angular portion of the locking extension, each clip comprising an axially extending seating portion projecting from said attaching portion and provided in its axially outer margin with an inwardly inclined portion for guiding the marginal portion of the cover member to its seat.

3. In combination, a wheel, a cover member removably associated with the outer face of the wheel and means for locking said cover member in place comprising a plurality of one-piece spring clips arranged substantially on the same diameter at circumferentially spaced locations, each of said clips comprising a central attaching portion for securing it to a wheel, generally circumferentially extending elongated resilient arms projecting freely and in opposite directions from said central attaching portion, and freely transversely projecting locking extensions on the free ends of said arms, each of said locking extensions being of angular form with the vertices of their angles lying substantially in a common plane normal to the axis of the wheel, each of said clips comprising also an axially extending seating portion projecting from the central attaching portion and independent of the resilient arms to receive and form a radial seat for a marginal portion of said cover member.

4. In combination, a wheel, a cover member removably associated with the outer face of the wheel and means for locking said cover member in place comprising a plurality of one-piece spring clips arranged substantially on the same diameter at circumferentially spaced locations, each of said clips comprising a central attaching portion for securing it to a wheel, generally circumferentially extending elongated resilient arms projecting freely and in opposite directions from said central attaching portion, and freely transversely projecting locking extensions on the free ends of said arms, each of said locking extensions being of angular form with the vertices of their angles lying substantially in a common plane normal to the axis of the wheel, each of said clips comprising an axially extending seating portion inclined inwardly at its axially outer margin and projecting from said central mounting portion and independent of the resilient arms, the inwardly inclined portion guiding the marginal portion of the cover member to its seat.

5. A unitary one-piece attachment clip for securing a removable cover member to a wheel comprising a central attaching portion for securing it to a wheel, oppositely generally circumferentially extending elongated resiliently flexible arms projecting freely from said central mounting portion and each having a freely laterally projecting locking extension from its free end, said lateral locking extensions being of angular form the sides of which provide cam surfaces with the vertices of their angles lying substantially in a common plane, which plane is normal to the wheel axis when the clip is mounted on a wheel, said clip also comprising an axially extending portion projecting from said attaching portion and independent of said flexible arms to form a seat for the marginal portion of a cover member.

6. A unitary one-piece attachment clip for, in cooperation with other similar clips, securing a removable cover member to a wheel comprising an attaching portion for securing it to a wheel, an elongated resiliently flexible portion extending freely at an angle to said attaching portion and having at its free end a locking extension thereof bent into substantially right angular form, the apices of all said angular form locking extensions of all the clips lying substantially in a plane normal to the axis of a wheel when the clips are in position thereon, one side of said angular form locking extension being arranged to form a cam surface engaged by the marginal portion of a cover member when it is applied to a wheel to cam the elongated flexible portion and its locking extension aside until the marginal portion passes the apex of the angle when the cover member will be snapped into place and securely held therein by the engagement of its marginal portion with the cam surface formed by the other side of said angular form locking extension and with the similar cam surfaces of the cooperating clips, said clip also comprising an axially extending portion projecting from its mounting portion and independent of said flexible portion to form a seat for the marginal portion of a cover member.

7. A unitary one-piece attachment clip for securing, in cooperation with other similar clips, a removable cover member to a wheel comprising an attaching portion for securing it to a wheel, an elongated resiliently flexible portion extending freely at an angle to said attaching portion and having at its free end a freely transversely projecting locking extension thereof bent into substantially right angular form, the sides of said angular form locking extension providing cam surfaces, the apices of all the angular form locking extensions of all the clips lying substantially in a plane normal to the axis of a wheel when the clips are in position thereon, one side of said angular form locking extension being arranged to form a cam surface engaged by the marginal portion of a cover member when it is applied to a wheel to cam the elongated flexible portion and its locking extension aside until the marginal portion passes the apex of the angle when the cover member will be snapped into place and securely held therein by the engagement of its marginal portion with the other side of said locking extension and with the similar sides of the cooperating clips, said clip also comprising an axially extending cover member seating portion projecting from said mounting portion and independent of said flexible portion and having its axially outer margin inclined inwardly to guide the cover member to its seat.

CAROLUS L. EKSERGIAN.
PAUL W. GAENSSLE.